United States Patent Office 3,242,113
Patented Mar. 22, 1966

3,242,113
HEAT RESISTANT CHLOROPRENE BASED
ADHESIVES
Robert M. Kell, Columbus, Ohio, assignor, by mesne assignments, to Swift & Company, Chicago, Ill., a corporation of Illinois
No Drawing. Filed May 17, 1962, Ser. No. 195,409
9 Claims. (Cl. 260—27)

This invention relates to adhesive compositions and more particularly to improved high strength heat-resistant adhesives of the synthetic elastomer-synthetic resin type and to a method for imparting to such adhesives increased bond strength at elevated temperatures.

Rubber base adhesives have been used as industrial adhesives for many years because of the desirable qualities which such adhesives possess. Thus, polymerized chloroprene or neoprene has been used as the elastomer component in rubber base cements, along with phenolic resins such as phenol-aldehyde resins and more recently with specific reactive phenolic resins prepared from para-alkyl substituted phenols and formaldehyde. These adhesives are reported to provide a bond possessing high internal strength, good specific adhesion to metal surfaces, and resistance to gelation during storage. One shortcoming in such adhesives, however, is the failure of the adhesive bond when exposed to elevated temperatures.

Further improvement in neoprene base adhesives of this type is described in the United States patent to Jack A. Gerrard et al., No. 2,918,442 the disclosure of which is incorporated herein by reference. This patent describes a modification of the coatable liquid elastomeric compositions comprising the incorporation of relatively large amounts of alkali or alkaline earth oxides or hydroxides into mixtures of neoprene and reactive phenolic resins. The alkali or alkaline earth metal oxides or hydroxides improve the stability of the adhesive bond at elevated temperatures.

The present invention represents a further improvement in adhesives based upon neoprene and phenolic resins in providing improved adhesives of this type made up of either reactive or non-reactive phenolic resins and containing a novel additive imparting heat resistance to the adhesive.

It is, accordingly, an object of this invention to provide an improved method for improving the heat resistance characteristics of adhesives based upon neoprene elastomers and phenolic resins.

Another object of the invention is to provide new contact adhesives made up of polymerized chloroprene and phenolic resins resistant to a weakening of the adhesive bond resulting from the exposure of such adhesive bonds to elevated temperatures.

Still another object of the invention is the provision of adhesive compositions comprising a polymerized chloroprene elastomer component and a nonreactive phenolic resin component which compositions are protected against heat-induced bond failure.

Additional objects of the invention, if not specifically set forth herein, will be readily apparent to those skilled in the art from the detailed description of the invention which follows:

Generally, the invention is concerned with a method for protecting neoprene base adhesives against bond failure when the adhesive in the form of a dried film is exposed to elevated temperatures. It is, thus, possible to provide contact cements having a neoprene base which dry readily at room temperature to form a firm bond and which possess good green tack strength, high shear and peel strength, and improved resistance to adhesion failure when exposed to elevated temperatures. Furthermore, the adhesives exhibit good oil resistance, good shelf-stability and appearance. Protection against heat-induced bond failure is provided by embodying in the adhesive a small amount of metal chelates of beta-diketone.

More specifically, the method of the invention comprises embodying a small amount of a metal chelate of a diketone or mixtures of beta-diketones in heat-sensitive contact cements to improve the heat resistance properties of the cement and provide an adhesive possessing the desirable properties previously noted in neoprene base contact cements of this type and, in addition, possessing improved heat resistance. The compositions comprise an elastomer component, a resin component, and a small amount of a coordinate composition characterized as a metal chelate of beta-diketones. The compositions may also be formulated containing salts which aid in providing heat resistance such as the alkali or alkaline earth metal oxides or hydroxides, tackifying resins to improve initial grab and extend open time of the cement, fillers, and solvent carriers.

The chelates are added to the cement mixture and the approximate ranges of amounts of the components of the cements of the invention are as follows.

| Component: | Parts |
|---|---|
| Chloroprene elastomer (neoprene) | 100. |
| Resin | 25–200 (40–100 preferred). |
| Chelate | 2–20. |
| Magnesium oxide (optional) | 0–30. |

The elastomer component of the improved cement can be any of the polymerized chloroprene polymers, preferably neoprene, although copolymers of chloroprene with small amounts of monomers such as isoprene, acrylonitrile and butadiene are also contemplated. Various neoprenes and neoprene-phenolic adhesives are described in U.S. Patent No. 2,610,910, issued to Andrew Farley Thomson. Commercially available neoprenes such as Type CG, Neoprene Type AD, Neoprene Type GN, Neoprene W and Neoprene AC can be used in compositions. Neoprene CG is a sulfur modified, thiuram disulfide stabilized chloroprene polymer polymerized at a low temperature. Its physical properties are:

Specific gravity _____ 1.23.
Color _____ Amber to light green.
Odor _____ None.
Physical form _____ Chips.
Storage stability _____ Fair.
Solubility (after plasticization),
  soluble in aromatic and chlorinated hydrocarbons and in
  certain esters and ketones, either alone or in blends with
  aliphatic hydrocarbons.
Crystalliaztion rate _____ Very fast.

Neoprene AD is a chloroprene polymer containing no additives which contribute to discoloration, staining of finishes, or which affect the cure of other elastomers. Its physical properties are:

| | |
|---|---|
| Specific gravity | 1.23. |
| Color | Silvery white. |
| Odor | None. |
| Physical form | Chips. |
| Storage stability (generally no change in viscosity at normal storage temperatures | Exellent. |
| Solubility | Easily soluble in usual neoprene solvents. |
| Polymer viscosity Mooney viscosity is required with Type AD than with Type AC to impart comparable solution viscosity at a given solids content. | Somewhat higher. |
| Crystallization rate | Very fast. |

Neoprene GN is a sulfur modified, thiuram disulfide stabilized chloroprene polymer. With the following physical properties:

| | |
|---|---|
| Specific gravity | 1.23. |
| Color | Amber. |
| Odor | None. |
| Physical form | Chips. |
| Storage stability | Fair. |
| Solubility (after plasticization), soluble in aromatic and chlorinated hydrocarbons and in certain esters and ketones, either alone or in blends with aliphatic hydrocarbons. | |
| Crystallization rate | Moderate. |

Neoprene W is a chloroprene polymer containing no additives which contribute to discoloration, staining of finishes, or which affect the cure of other elastomers. It has the following physical properties:

| | |
|---|---|
| Specific gravity | 1.23. |
| Color | Silver-gray or light amber. |
| Odor | None. |
| Physical form | Chips. |
| Storage stability | Excellent. |
| Solubility (no premastication necessary) soluble in aromatic and chlorinated hydrocarbons in certain esters and ketones, either alone or in blends with aliphatic hydrocarbons. | |
| Crystallization rate | Moderately fast. |

Neoprene AC is a chloroprene polymer stabilized with thiuram disulfide. It contains no additives which contribute to discoloration or the staining of finishes. It has the following physical properties:

| | |
|---|---|
| Specific gravity | 1.23. |
| Color | Cream to light green. |
| Odor | None. |
| Physical form | Chips. |
| Storage stability | Excellent. |
| Solubility (soluble in aromatic and chlorinated hydrocarbons and in certain esters and ketones, either alone or in blends with aliphatic hydrocarbons). | |
| Crystallization rate | Very fast. |

The neoprene can be milled or unmilled since unmilled neoprene provides maximum heat resistance while milling appears to improve the machining properties of the composition, although heat resistance properties are thereby diminished.

Although the chelate compositions exhibits the most apparent benefit in compositions containing nonreactive resins as distinguished from the reactive phenolic resins, the invention includes as the resin component neoprene compatible compositions containing either or both of the reactive type and also nonreactive resins. Cements containing nonreactive resins, such as the terpene phenolics and modified rosins are markedly improved, insofar as resistance to heat-induced failure is concerned, by the chelates of this invention. The heat reactive resins including condensation products of formaldehyde and alkyl substituted paraphenols such as those described in the aforementioned Gerrard et al. patent can be present as the resinous component of the contact adhesive but greatest benefits are imparted to cements containing the previously mentioned nonreactive terpene phenolics. These resins are prepared by reacting a phenol and a terpene or terpene alcohol to form the resin. Maleic anhydride and formaldehyde may also be used in the condensation reaction. Durez, 12,603, is an example of a commercially available thermoplastic oil soluble terpene modified phenolic resin having a capillary melting point of about 270° F., while Durez 240 is a similar product having a capillary melting point of about 335° F.

Durez 12,603 resin is a terpene phenolic, oil soluble, high-melting, low-viscosity, thermoplastic resin having the following properties:

| | |
|---|---|
| Melting point (capillary tube) °C | [1] 133 |
| Melting point (ball and ring) °C | [1] 152 |
| Acid number | [1] 65 |
| Color (rosin scale) | N–I |
| Color (Gardner scale) | [1] 10 |
| Specific gravity @ 25° C. | [1] 1.09 |
| Refractive index @ 25° C. | [1] 1.552 |
| Viscosity in toluol @ 60% (Gardner-Holdt) | [1] E |

[1] Avg.

Durez 12,603 resin is soluble in all proportions in the following solvents: Amyl acetate, benzol, butanol, butyl acetate, Carbitol acetate, carbon tetrachloride, Cellosolve, Cellosolve acetate, diacetone alcohol, diphentene, ethyl acetate, ethyl ether, kerosene, methyl ethyl ketone, methyl isobutyl ketone, mineral spirits, Pentasol, toluol, turpentine, xylol. Durez 12,603 resin tolerates the following at resin concentrations above those indicated:

| | Percent |
|---|---|
| Acetone | 27 |
| Dipropylene glycol | 60 |
| Isopropyl alcohol | 47 |

Durez 12,603 resin is insoluble in the following:

Diethylene glycol
Ethyl alcohol
Ethylene glycol

Durez 240 resin is a terpene phenolic, oil soluble, very high-melting, high-viscosity, thermoplastic resin. It has the following properties:

| | |
|---|---|
| Melting point (capillary tube) °C | [1] 168 |
| Melting point (ball and ring) °C | [1] 186 |
| Acid number | [1] 60 |
| Color (rosin scale) | M–H |
| Color (Gardner scale) | [1] 11 |
| Specific gravity @ 25° C. | [1] 1.09 |
| Refractive index @ 25° C. | [1] 1.565 |
| Viscosity in toluol @ 60% resin (Gardner-Holdt) | Z3–Z4 |

[1] Avg.

Durez 240 resin in soluble in all proportions in the following solvents: Amyl acetate, butyl acetate, dipentene, methyl isobutyl ketone, toluol, turpentine and xylol. Durez 240 resin is soluble in the following solvents at resin concentrations above these indicated:

| | Percent |
|---|---|
| Butanol | 48 |
| Carbitol acetate | 20 |
| Cellosolve | 30 |
| Cellosolve acetate | 17 |
| Diacetone alcohol | 45 |
| Ethyl acetate | 14 |
| Ethyl ether | 11 |
| Kerosene | 33 |
| Methyl ethyl ketone | 13 |
| Mineral spirits | 20 |
| Pentasol | 30 |

Durez 240 resin is insoluble in the following:

| | |
|---|---|
| Actone | Diethylene glycol |
| Carbitol | Ethyl alcohol |
| Dipropylene glycol | Isopropanol |

More specifically, Dymerex is a pale, acidic, thermoplastic, high-softening point resin. It consists of approximately 80% resin acid dimers and 20% monomeric resin acids and neutral material. Dymerex resin has high resistance to oxidation and does not crystallize from solutions or from solid compositions containing it. It is compatible with many natural and synthetic film-formers and rubbers. Being an acidic resin, it reacts readily with polyalcohols or hydrated lime to produce high-melting derivatives. It is available in flake and lump forms. It has the following properties:

| | |
|---|---|
| Softening point (Hercules drop method) | 145–158° C. |
| Color (U.S. rosin grade) | K max. |
| Acid number | 131–150. |
| Saponification number | 145. |
| Unsaponifiable material | 8%. |
| Gasoline insoluble | Percent nil. |
| Molecular weight, average | 502. |
| Density at 20° C. | 1.069. |

It is soluble in alcohols, esters, ketones, hydrocarbons, chlorinated solvents and mineral oils. It is insoluble in water.

Pentalyn A is a hard, pale amber-colored resin and is the simplest form of a series of modified Pentalyn resins, all based on pentaerythritol. It has the following properties.

| | |
|---|---|
| Softening point (Hercules drop method) _° C__ | 109–116 |
| Color (USDA resin scale) | M max. |
| Acid number | 16 max. |
| 60% solids solution in mineral spirits: | |
| Color (Gardner, 1933 standards) | 11 max. |
| Viscosity (Gardner-Holdt) at 25° C. | E–H |
| Refractive index @ 20° C. | 1.544. |
| Specific gravity @ 25/25° C. | 1.08. |

It is soluble in esters, ketones, aromatic aliphatic hydrocarbons, and higher alcohols. It is insoluble in ethyl alcohol and water.

Pentalyn H is a hard, amber-colored resin which is designed primarily as a tackifying resin for use in adhesives. In general, Pentalyn H is quite similar to Pentalyn A, a pentaerythritol ester of regular rosin. It has the following properties:

| | |
|---|---|
| Softening point (Hercules drop method) _° C_ | 102–110 |
| Color (U.S.D.A. rosin scale) | K max. |
| Acid number | 18 max. |
| 60% solids solution in mineral spirits (viscosity (Gardner-Holdt) at 25° C.) | B–E |
| Specific gravity @ 25/25° C. | 1.07 |

It is resinous, tacky, persistently adhesive having high bonding strength, and resistant to oxidation. It is soluble in aromatic and aliphatic hydrocarbons, esters, and ethers. It is insoluble in alcohols.

The chelate which is employed to improve the properties of neoprene base contact cements is selected from chelates of alkaline earth metals and chelates of metals of the zinc family, such as zinc and cadmium as well as copper. These metals form reaction products believed to be chelates with 1,3-diketones having the structure:

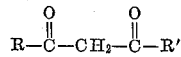

where R and R' are selected from the group consisting of aliphatic hydrocarbon radicals and benzene radicals. The beta diketones wherein R and R' are lower alkyl and/or phenyl are preferred inasmuch as compounds of this type are readily available. The higher alkyl, alkylaryl and aryl radicals are also suitable substituents for R and R'. The chelate is formed by reacting the oxide of the metal, with the diketone in a solvent medium and recovering the precipitated chelate. Chelates of magnesium, for example, are formed by reacting magnesium oxide with 2,4-pentanedione. Additional specific beta ketones which can be employed in forming the chelate include 1,3-diphenyl-1,3-propanedione, 1-phenyl-1,3 butanedione, 1-phenyl-1,3-pentanedione. The coordination compound may also be prepared by forming the ammonium salt of the beta aliphatic diketone and reacting this compound with a salt of the metal such as the chloride, acetate, carbonate, hydroxide or oxide. Some of the metal diketone derivatives are more effective than others, although those of acetyl acetone (2,4-pentanedione) have been favored because of availability and freedom from any shortening of shelf-like of the cement compositions. Specific examples of the preparation of suitable chelates are set out in Examples I and II which follow. These Examples are intended as illustrative of specific embodiments of the invention.

EXAMPLE I

A mixture of 6 parts magnesium oxide and 20 parts of 2,4-pentanedione and 100 parts toluene was agitated for 16 hours at room temperature. At the end of this time an insoluble, white chelate of the ketone had formed as a residue. This material was filtered, dried and ground for use in the neoprene-based adhesives.

In a similar manner, 0.5 grams of 1-phenyl-1,3-butanedione and 0.1 gram of magnesium oxide in 5 grams of toluene was reacted at room temperature to form the magnesium chelate of this ketone which also precipitated from the solvent and was isolated by filtration.

EXAMPLE II

An alternative method for preparing chelates involves the following procedure: 10 grams of 2,4-pentanedione is mixed with 40 milliliters of water and an oily layer of the ketone appears. Ammonium hydroxide (6N) is added to this mixture with agitation until the oily layer disappears. A mixture of 8 grams of magnesium chloride in 40 milliliters of water is added to this mixture and a white precipitate of magnesium acetyl acetonate forms. The product is removed from the solution by filtration and then washed and dried.

Other chelates made from 1,3-diphenyl-1,3-propanedione and magnesium oxide were prepared in a similar manner simply by mixing the magnesium oxide with the ketone in a solvent medium.

While the chelate alone can be employed as the stabilizing agent, particularly where the resin component is a nonreactive terpene phenolic resin, the stability of the adhesive can be further supplemented by adding a small amount of the alkali metal or alkaline earth metal oxide or hydroxide to the adhesive, in addition to the chelate.

Amount of the chelate in the range around 2-20 parts based upon 100 parts of neoprene imparts improved heat resistance properties, but this protection against heat degradation is further enhanced by the addition of a small amount of the metal salt.

EXAMPLE III

Tests to demonstrate the improved heat resistance provided by the ketone chelates of the invention were conducted by determining the bond strength of various adhesive formulations. High-pressure plastic laminate in the form of a 2 inch by 2½-inch panel was bonded to white pine wood blocks 2 x 2 inches in size. The adhesive formulation under test was employed to bond the laminate to the wooden block. After bonding the wooden block to the plastic laminate, the assemblies were aged for 5 days at room temperature and then placed in an over at a temperature of 180° F. 1,000-gram weights were suspended from one end of the plastic laminate. The weight causes either a total separation of the two parts of a measurable degree of separation at the weighted end and the amount of separation is a measure of the sensitivity of the adhesive bond to the effect of elevated temperatures. Various adhesive formulations made up of the components as shown in Table I, which follows, showed the resistance to heat degradation of the bond as noted.

Table I

| Component | Parts by Weight | | | | | | | |
|---|---|---|---|---|---|---|---|---|
| | A | B | C | D | E | F | G | H |
| Neoprene AC (unmilled) | 100 | 100 | 100 | 100 | 100 | 100 | 100 | 100 |
| Durez 12,603 | 50 | 50 | 50 | 50 | 50 | 50 | 50 | 50 |
| Magnesium Oxide | | 5 | 5 | 5 | | | 5 | 5 |
| Magnesium Acetyl Acetonate | | 1 | 2.5 | 5 | | | | |
| Calcium Acetyl Acetonate | | | | | 0.5 | 20 | | 5 |
| Hexane | 250 | 250 | 250 | 250 | 250 | 250 | 250 | 250 |
| Toluene | 150 | 150 | 150 | 150 | 150 | 150 | 150 | 150 |
| Methylethyl Ketone | 150 | 150 | 150 | 150 | 150 | 150 | 150 | 150 |

Behavior of plastic laminate to wood specimens at 180° F.:
A—Complete separation of parts in 1 minute.
B—Separation after 1 hour.
C—No separation in 1 hour.
D—No separation in 1 hour.
E—Complete separation in 6 min.
F—No separation in 1 hour.
G—Separation after 27 min.
H—No separation in 1 hour.

The solvent mixture employed as a carrier for the contact adhesive is generally a balanced system for desired evaporation rate, cost, viscosity, and sprayability. The aromatic solvents, such as toluene, along with the lower aliphatic hydrocarbons, including hexane, are very desirable solvents for the system. Lower aliphatic ketones such as acetone and methylethyl ketone are also useful. The control of the solvent system is easily determined by those skilled in the art.

Obviously many modifications and variations of the invention as hereinbefore set forth may be made without departing from the spirit and scope thereof and, accordingly, only those limitations should be imposed as are indicated in the appended claims.

I claim:

1. Contact cement compositions comprising: polymerized chloroprene, about 25-200 parts based on 100 parts of said polymerized chloroprene of a resin selected from the group consisting of phenolaldehyde condensation products of formaldehyde and substituted phenols, terpene phenolic resins, pentaerythritol ester of rosin, pentaerythritol ester of hydrogenated rosin and polymerized rosin comprising about 80% resin acid dimers and about 20% monomeric resin acids and neutral material, and mixtures thereof, at least about 2 parts based on 100 parts of said polymerized chloroprene of a chelate of beta diketone with a metal selected from the group consisting of alkaline earth metals, zinc, cadmium and copper, and a small amount sufficient to provide heat resistance to said composition of a salt selected from the group consisting of alkali and alkaline earth oxides and hydroxides and mixtures thereof.

2. Contact cement compositions which when applied to a substrate in the form of a film possess a high initial tack and high strength and which are protected against loss of strength at elevated temperatures comprising: a mixture of about 100 parts polymerized chloroprene, about 25-200 parts based on 100 parts of said polymerized chloroprene of a resin selected from the group consisting of phenol-aldehyde condensation products of formaldehyde and substituted phenols, terpene phenolic resins, pentaerythritol ester of rosin, pentaerythritol ester of hydrogenated rosin, and polymerized rosin comprising about 80% resin acid dimers and about 20% monomeric resin acids and neutral material, and mixtures thereof, at least about one part based on 100 parts of said polymerized chloroprene of a chelate of beta diketone with a metal selected from the group consisting of alkaline earth metals, zinc, cadmium and copper.

3. Improved contact cement compositions having an increased resistance to heat-induced deterioration in strength comprising: a mixture of about 100 parts polymerized chloroprene, about 25-200 parts based on 100 parts of said polymerized chloroprene of a resin selected from the group consisting of phenol-aldehyde condensation products of formaldehyde and substituted phenols, terpene phenolic resins, pentaerythritol ester of rosin, pentaerythritol ester of hydrogenated rosin and polymerization rosin comprising about 80% resin acid dimers and about 20% monomeric resin acids and neutral material and mixtures thereof, and about 2-20 parts based on 100 parts of said polymerized chloroprene of a chelate of beta diketone with a metal selected from the group consisting of alkaline earth metals, zinc, cadmium and copper.

4. The composition of claim 3 wherein the resin is present in an amount of about 40-100 parts based on 100 parts of the said polymerized chloropene.

5. Contact cement compositions comprising: polymeriezd chloroprene, about 25-200 parts based on 100 parts of said polymerized chloroprene of a phenol aldehyde condensation product of formaldehyde and substituted phenols, at least about 2 parts based on 100 parts of said polymerized chloroprene of a chelate of beta diketone with a metal selected from the group consisting of alkaline earth metals, zinc, cadmium and copper and a small amount of a salt selected from the group consisting of alkali and alkaline earth oxides and hydroxides and mixtures thereof.

6. The composition of claim 3 wherein the chelate is a magnesium chelate of acetyl acetonate.

7. The composition of claim 3 wherein the chelate is a calcium chelate of acetyl acetonate.

8. A liquid adhesive composition comprising: a smooth uniform mixture in a volatile inert liquid organic solvent of polymerized chloroprene, about 25-200 parts based on 100 parts of said chloroprene of a resin selected from the group consisting of phenol-aldehyde condensation products of formaldehyde and substituted phenols, terpene phenolic resins, pentaerythritol ester of rosin, pentaerythritol ester of hydrogenated rosin and polymerized rosin comprising about 80% resin acid dimers and about 20% monomeric resin acids and neutral material, and mixtures thereof, and about 2-20 parts based on 100 parts of said polymerized chloroprene of a chelate of beta diketone with a metal selected from the group consisting of alkaline earth metals, zinc, cadmium and copper.

9. A method for improving the bond strength of polymerized chloroprene based adhesives comprising:

embodying in and disturbing throughout a polymerized chloroprene adhesive comprising polymerized chloroprene and a resin selected from the group consisting of phenol-aldehyde condensation products of formaldehyde and substituted phenols, terpene phenolic resins, pentaerythritol ester of rosin, pentaerythritol ester of hydrogenated rosin and polymerized rosin comprising about 80% resin acid dimers and about 20% monomeric resin acids and neutral material, and mixtures thereof, a small amount of a chelate of beta diketone with a metal selected from the group consisting of alkaline earth metals, zinc, cadmium and copper.

References Cited by the Examiner

UNITED STATES PATENTS

| | | | |
|---|---|---|---|
| 2,976,285 | 3/1961 | Gash | 260—438 |
| 3,016,297 | 1/1962 | Mochel et al. | 260—75 |

OTHER REFERENCES

Martell et al.: "Chemistry of the Metal Chelate Compounds," pages 510–513.

LEON J. BERCOVITZ, *Primary Examiner.*

DONALD E. CZAJA, *Examiner.*